(12) United States Patent
Choi

(10) Patent No.: US 9,402,094 B2
(45) Date of Patent: Jul. 26, 2016

(54) DISPLAY APPARATUS AND CONTROL METHOD THEREOF, BASED ON VOICE COMMANDS

(71) Applicant: Samsung Electronics Co., Ltd., Suwon-si (KR)

(72) Inventor: Hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/255,217

(22) Filed: Apr. 17, 2014

(65) Prior Publication Data

US 2015/0058885 A1 Feb. 26, 2015

(30) Foreign Application Priority Data

Aug. 23, 2013 (KR) .......................... 10-2013-0100404

(51) Int. Cl.
| H04N 5/445 | (2011.01) |
| H04N 21/422 | (2011.01) |
| G10L 21/0224 | (2013.01) |
| G10L 21/028 | (2013.01) |
| H04N 21/439 | (2011.01) |
| G10L 21/0216 | (2013.01) |
| G10L 15/20 | (2006.01) |
| H04R 3/00 | (2006.01) |

(52) U.S. Cl.
CPC ........ *H04N 21/42203* (2013.01); *G10L 21/028* (2013.01); *G10L 21/0224* (2013.01); *H04N 21/4394* (2013.01); *G10L 15/20* (2013.01); *G10L 2021/02161* (2013.01); *H04R 3/005* (2013.01); *H04R 2499/15* (2013.01)

(58) Field of Classification Search
CPC .......................... H04N 21/4622; H04N 21/482
USPC ....................................................... 725/12, 37
See application file for complete search history.

(56) References Cited

U.S. PATENT DOCUMENTS

| 6,606,280 B1 * | 8/2003 | Knittel ........................... 367/198 |
| 2011/0246193 A1 * | 10/2011 | Shin ............................... 704/233 |
| 2013/0016820 A1 | 1/2013 | Takayama et al. |

(Continued)

FOREIGN PATENT DOCUMENTS

| WO | 2011149969 A2 | 12/2011 |
| WO | 2012161555 A2 | 11/2012 |

OTHER PUBLICATIONS

Communication dated Feb. 24, 2015, issued by the European Patent Office in counterpart European Application No. 14170696.0.

(Continued)

*Primary Examiner* — Jivka Rabovianski
(74) *Attorney, Agent, or Firm* — Sughrue Mion, PLLC

(57) ABSTRACT

A display apparatus and a method of controlling a display apparatus are disclosed. The display apparatus includes: a display configured to display an image based on a video signal; a sound output section configured to output a first sound based on a sound signal; a first sound receiver configured to receive a first mixed sound including the first sound and a second sound of a user; a second sound receiver which is spaced apart at a distance from the first sound receiver and is configured to receive a second mixed sound comprising the first sound and the second sound; and a controller configured to perform control in accordance with the second sound of the user, the second sound being acquired based on the first mixed sound and the second mixed sound.

20 Claims, 7 Drawing Sheets

(56) References Cited

U.S. PATENT DOCUMENTS

| | | |
|---|---|---|
| 2013/0027329 A1 | 1/2013 | Sugiura et al. |
| 2013/0030297 A1 | 1/2013 | Katsuyama |
| 2013/0032152 A1 | 2/2013 | Reuterholt et al. |
| 2013/0033374 A1 | 2/2013 | Nakajima et al. |
| 2013/0034066 A1 | 2/2013 | Kakishima et al. |
| 2013/0039305 A1 | 2/2013 | Kishiyama et al. |
| 2013/0039319 A1 | 2/2013 | Shi et al. |
| 2013/0044887 A1 | 2/2013 | Dong et al. |
| 2013/0044893 A1 | 2/2013 | Mauchly et al. |
| 2013/0051562 A1 | 2/2013 | Ozawa et al. |
| 2013/0051594 A1 | 2/2013 | Semcken |
| 2013/0057165 A1 | 3/2013 | Ide et al. |
| 2013/0077810 A1 | 3/2013 | Mellow et al. |
| 2013/0085008 A1 | 4/2013 | Hall |
| 2013/0103028 A1 | 4/2013 | Tsoref et al. |
| 2013/0114821 A1 | 5/2013 | Hamalainen |
| 2013/0121280 A1 | 5/2013 | Ouchi et al. |
| 2013/0136266 A1 | 5/2013 | McClain |
| 2013/0136282 A1 | 5/2013 | McClain |
| 2014/0126746 A1 | 5/2014 | Shin et al. |

OTHER PUBLICATIONS

Communication dated Mar. 3, 2016, issued by the European Patent Office in counterpart European Application No. 14170696.0.

\* cited by examiner

DISPLAY APPARATUS AND CONTROL METHOD THEREOF, BASED ON VOICE COMMANDS

CROSS-REFERENCE TO RELATED APPLICATION

This application claims priority from Korean Patent Application No. 10-2013-0100404, filed on Aug. 23, 2013 in the Korean Intellectual Property Office, the disclosure of which is incorporated herein by reference in its entirety.

BACKGROUND

1. Field

Apparatuses and methods consistent with the exemplary embodiments relate to a display apparatus and a control method thereof, and more particularly a display apparatus, which operates in accordance with a user's voice commands, and a control method thereof.

2. Description of the Related Art

In a display apparatus such as a smart television (TV), voice recognition or motion recognition has been generalized. To this end, a microphone or a camera is installed in the display apparatus. The display apparatus applies the voice recognition to a user's voice input through the microphone, and applies the motion recognition to an image input through the camera.

Meanwhile, in the voice recognition using the microphone, sound output from the display apparatus has to be regarded as noise and thus canceled in order to correctly recognize contents corresponding to a user's voice. For example, in the case of an external microphone, an additional signal line is connected to the external microphone and thus information related to the sound output from the display apparatus is transmitted, thereby canceling the sound. However, the connection of such a separate signal line for transmitting the sound information may increase a production cost of the display apparatus or may restrict a design space.

Further, even in the case of a built-in microphone, sound information in the display apparatus may not be matched with an actually output sound in accordance with environments in which the display apparatus is installed (e.g., installation environments), performance or conditions of a loudspeaker provided in the display apparatus and outputting the sound, and so on. In this case, a problem arises in that reliability on canceling the sound is reduced.

SUMMARY

One or more exemplary embodiments may provide a display apparatus and a control method thereof, which provides high reliability on canceling a sound output from the display apparatus without increasing costs or restricting a space with respect to voice recognition for a user.

According to an aspect of another exemplary embodiment, a display apparatus includes: a display configured to display an image based on a video signal; a sound output section configured to output a first sound based on a sound signal; a first sound receiver configured to receive a first mixed sound including the first sound and a second sound of a user; a second sound receiver which is spaced apart from the first sound receiver and is configured to receive a second mixed sound including the first sound and the second sound; and a controller configured to perform control in accordance with the second sound of a user acquired based on the first mixed sound and the second mixed sound.

The first sound receiver may be configured to be closer in proximity to the sound output section, and the second sound receiver may be configured to be closer in proximity to the user.

The second sound of a user may be acquired based on respective receiving ratios of the first sound receiver and the second sound receiver with regard to the first sound and the second sound.

The controller may determine the respective receiving ratios of the first sound receiver and the second sound receiver based on a test sound.

The test sound may include a plurality of test sounds corresponding to a plurality of frequency domains, respectively.

The display apparatus may further include a storage section configured to store information about the respective receiving ratio determined based on the test sound.

The display apparatus may further include a control command receiver configured to receive a control command of the user, wherein the controller performs a test based on the test sound in accordance with the control command of the user, and stores information about the determined respective receiving ratios in the storage section.

The first sound receiver and the second sound receiver may be included in an external sound receiver, and the display apparatus may include a connector which is connected to the external sound receiver. The display apparatus may receive the acquired second sound from the external sound receiver.

According to an aspect of another exemplary embodiment, a method of controlling a display apparatus is provided, the method including: displaying an image based on a video signal; outputting a first sound based on a sound signal; receiving a first mixed sound including the first sound and a second sound of a user through a first sound receiver, and receiving a second mixed sound including the first sound and the second sound through a second sound receiver, which is spaced apart from the first sound receiver; and operating in accordance with the second sound of the user, the second sound being acquired based on the first mixed sound and the second mixed sound.

The first sound receiver may be configured to be closer in proximity to a sound output section, and the second sound receiver may be configured to be closer in proximity to the user.

The second sound of the user may be acquired based on respective receiving ratios of the first sound receiver and the second sound receiver with regard to the first sound and the second sound.

The method may further include determining respective receiving ratios of the first sound receiver and the second sound receiver based on a test sound.

The test sound may include a plurality of test sounds corresponding to a plurality of frequency domains, respectively.

The method may further include storing information about the respective receiving ratios determined based on the test sound in a storage section.

The method may further include receiving a control command of the user, wherein the storing may include performing a test based on the test sound in accordance with the control command of the user, and storing information about the determined respective receiving ratios in the storage section.

The method may further include receiving the acquired second sound from an external sound receiver including the first sound receiver and the second sound receiver.

The second sound receiver may be spaced apart at a predetermined distance from the first sound receiver.

The respective ratios relate to a ratio of the first sound to the second sound respectively received in the first sound receiver and the second sound receiver.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
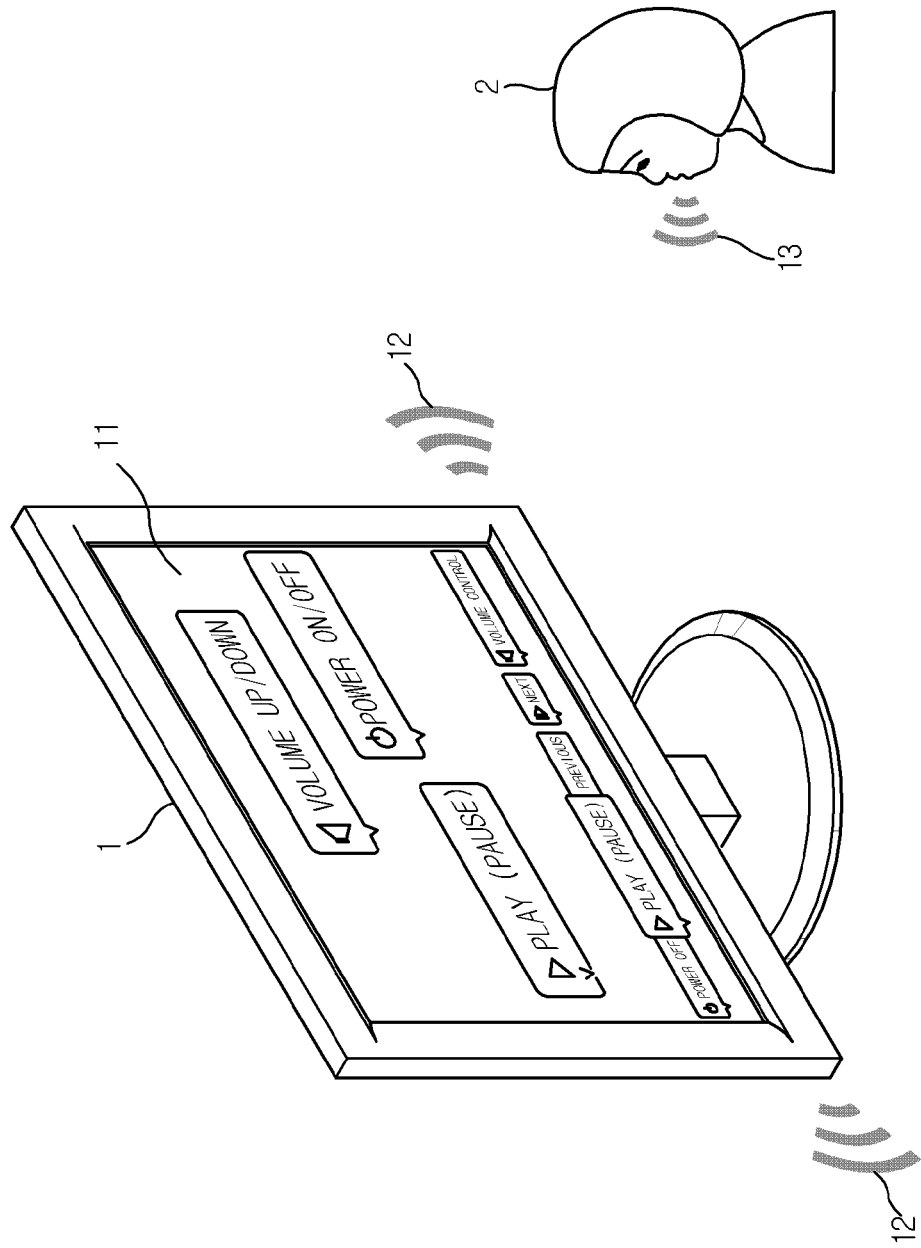
FIG. 1 shows a display apparatus according to an exemplary embodiment.

Below, exemplary embodiments will be described in detail with reference to the accompanying drawings. FIG. 1 shows a display apparatus according to an exemplary embodiment. A display apparatus 1 may for example be achieved by a television (TV). The display apparatus 1 outputs an image 11, and a sound 12 (hereinafter, referred to as a 'first sound'). A user 2 may control the display apparatus 1 by his/her own sound 13 (hereinafter, referred to as a 'second sound') while enjoying the image 11 and the sound 12 output from the display apparatus 1. The display apparatus 1 receives and recognizes the second sound 13 of a user 2, and operates in accordance with recognized commands. For example, the display apparatus 1 may operate to increase or decrease volume, play or pause contents, and be powered on/off.

While recognizing the second sound 13 of a user 2, the display apparatus 1 regards the first sound 12 output from the display apparatus 1 as noise and cancels it. The display apparatus 1 includes two sound receivers (refer to reference numerals 24 and 25 in FIGS. 2 and 4), and acquires the second sound 13 of a user 2 based on a mixed sound between the first sound 12 and the second sound 13 received through two sound receivers, respectively. Thus, according to an exemplary embodiment, there is no need of an additional signal line and the like, thereby preventing a production cost from increasing or a design space from being restricted. Also, according to an exemplary embodiment, a user's second sound 13 is acquired from the mixed sound, on which the first sound 12 actually output from the display apparatus 1 is reflected, thereby canceling the sound with higher reliability.

Figure 2:
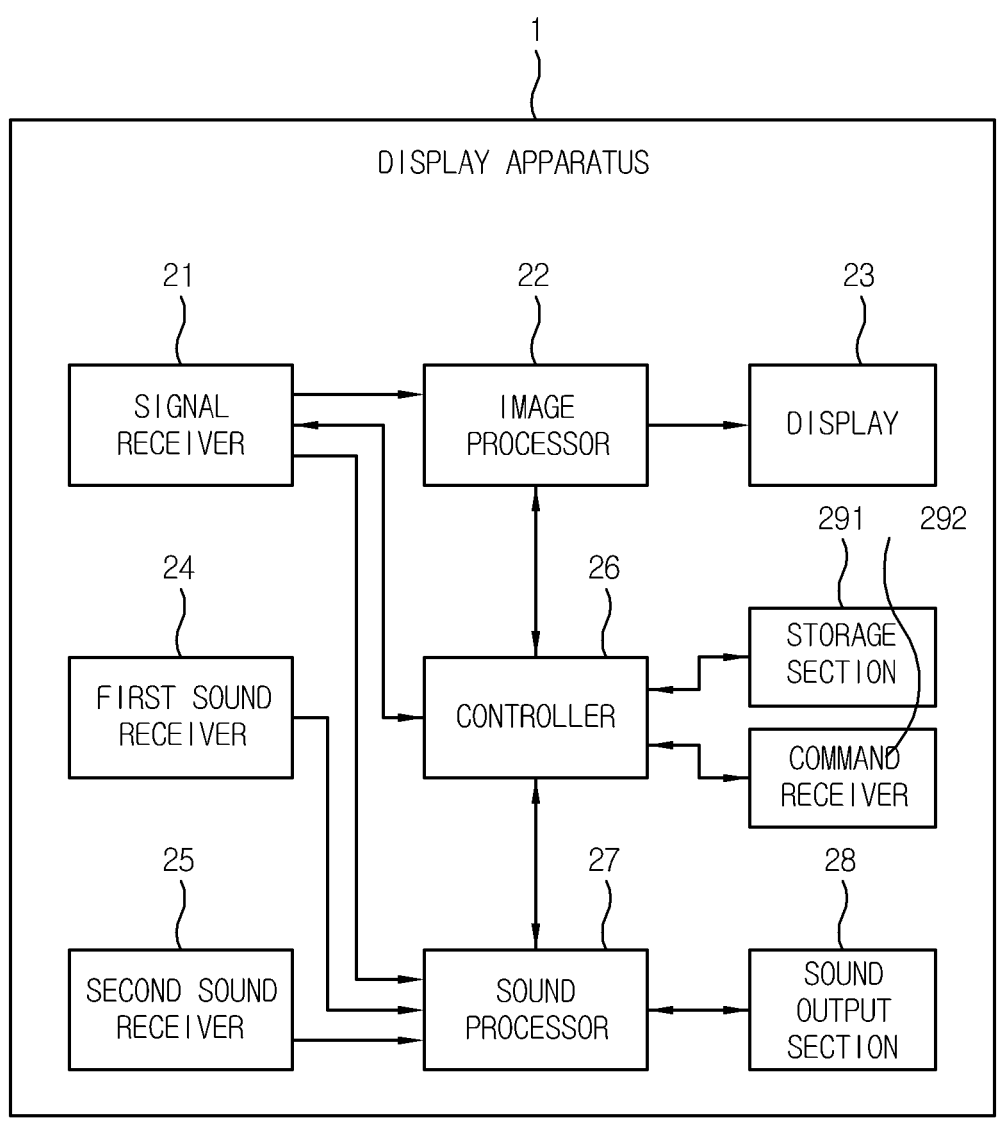
FIG. 2 is a block diagram showing elements of the display apparatus according to an exemplary embodiment.

FIG. 2 is a block diagram showing elements of the display apparatus 1 according to an exemplary embodiment. The display apparatus 1 may include a signal receiver 21, an image processor 22, a display 23, a first sound receiver 24, a second sound receiver 25, a controller 26, a sound processor 27 and a sound output section 28. However, the elements of the display apparatus 1 shown in FIG. 2 are nothing but an exemplary embodiment, and may vary as necessary. That is, although it is not shown, at least one among the elements constituting the display apparatus 1 shown in FIG. 2 may be excluded, or another element may be added.

The signal receiver 21 receives a video signal and a sound signal. The signal receiver 21 may include the tuner to receive the video signal and the sound signal. Under control of the controller 26, the tuner may be tuned to one channel selected among a plurality of channels and receive the video signal and the sound signal through the tuned channel. Here, the channel may be selected by a user. For example, the display apparatus 1 may further include a command receiver 292 to receive a control command from a user. The command receiver 292 receives a control command of a user about the selection of the channel, and transmits it to the controller 26. The command receiver 292 may include a control panel to receive the control command of a user, or include a remote controller signal receiver to receive a remote controller signal containing the control command of a user from a remote controller.

Alternatively, the signal receiver 21 may receive the video signal and the sound signal from a set-top box, a digital versatile disc (DVD), a personal computer (PC), an imaging device, a smart phone or a similar peripheral device, or from a server over the Internet or a similar network.

The image processor 22 processes the received video signal to be displayed as an image on the display 23. With regard to the received video signal, the image processor 22 may for example perform image processing such as modulation, demodulation, multiplexing, demultiplexing, analog-digital conversion, digital-analog conversion, decoding, encoding, image enhancement, scaling, etc.

The display 23 displays an image based on the video signal processed by the image processor 22. The display 23 may employ various manners such as a liquid crystal display (LCD), a plasma display panel (PDP), an organic light emitting diode (OLED), etc. to display an image.

The sound processor 27 processes the received sound signal to be output as a sound through the sound output section 28. The sound output section 28 may include a loudspeaker.

As shown in FIG. 1, the first sound receiver 24 and the second sound receiver 25 respectively receive the first sound 12 output from the display apparatus 1, and the mixed sound in which the second sound 13 uttered by a user 2 is mixed. Each of the first sound receiver 24 and the second sound receiver 25 may include a microphone.

Figure 3:
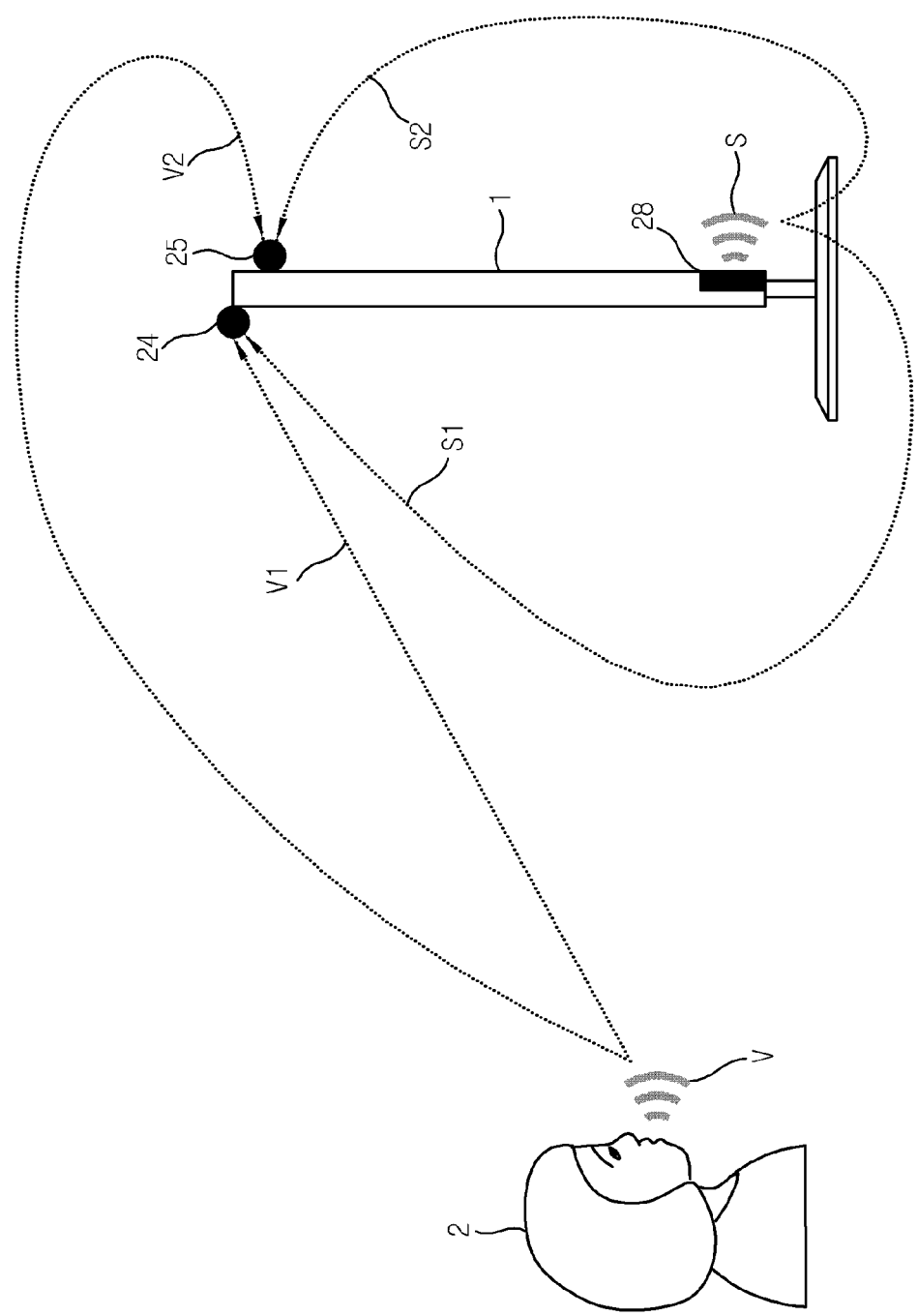
FIG. 3 shows a first sound receiver and a second sound receiver according to an exemplary embodiment.

FIG. 3 shows the first sound receiver 24 and the second sound receiver 25 according to an exemplary embodiment. As shown in FIG. 3, the first sound receiver 24 and the second sound receiver 25 are spaced apart at a predetermined distance from each other. According to an exemplary embodiment, the first sound receiver 24 may be close to a user 2, and the second sound receiver 25 may be close to the sound output section 28 of the display apparatus 1. Further, in this case, a likelihood of canceling the sound may increase the closer the first sound receiver 24 is to a user 2 and the closer the second sound receiver 25 is to the sound output section 28 of the display apparatus 1. In FIG. 3, a reference of 'S' refers to the first sound output from the sound output section 28 of the display apparatus 1, and a reference of 'V' refers to the second sound uttered by a user 2. As shown in FIG. 3, the first sound receiver 24 receives a first mixed sound in which a sound component S1 based on the first sound S output from the sound output section 28 and a sound component V1 based on the second sound V uttered by a user 2 are mixed. Meanwhile, the second sound receiver 25 receives a second mixed sound in which a sound component S2 based on the first sound S output from the sound output section 28 and a sound component V2 based on the second sound V uttered by a user 2 are mixed. That is, because the first sound receiver 24 and the second sound receiver 25 are spaced apart from each other, they receive the first mixed sound (S1+V1) and the second mixed sound (S2+V2), which have different sound components from each other, respectively.

The controller 26 recognizes the second sound V of a user 2 acquired from the first mixed sound (S1+V1) and the second mixed sound (S2+V2) received through the first sound receiver 24 and the second sound receiver 25, and controls the display apparatus 1 to operate in accordance with the recognized commands.

Figure 4:
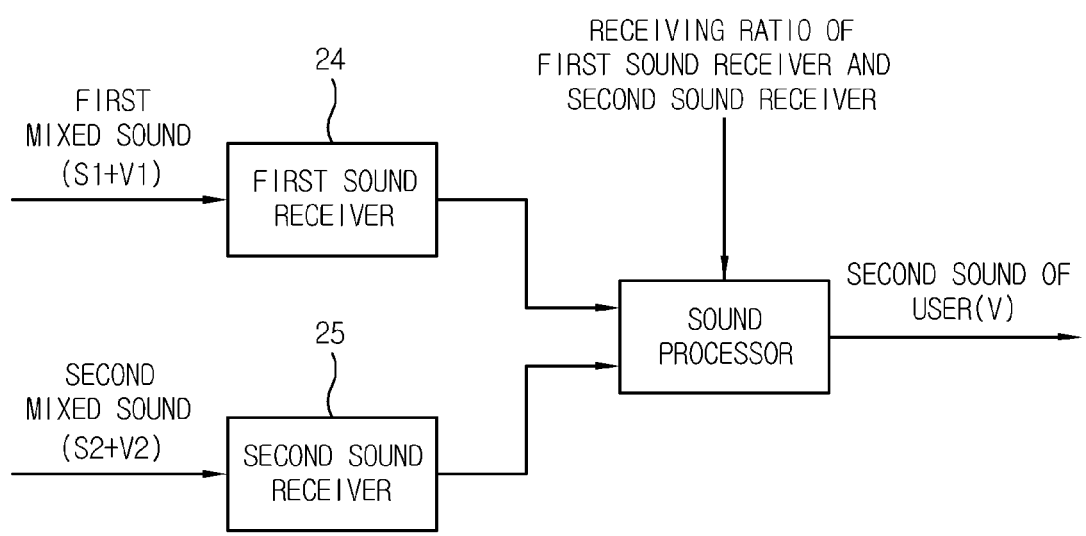
FIG. 4 shows a sound processor according to an exemplary embodiment.

In this exemplary embodiment, the sound processor 27 acquires the second sound (V) of a user 2 from the first mixed sound (S1+V1) and the second mixed sound (S2+V2). FIG. 4 shows a sound processor 27 according to an exemplary embodiment. The sound processor 27 receives the first mixed sound (S1+V1) and the second mixed sound (S2+V2) through the first sound receiver 24 and the second sound receiver 25. The sound processor 27 acquires the second sound (V) of a user 2 from the first mixed sound (S1+V1) and the second mixed sound (S2+V2), based on receiving ratios of the first sound receiver 24 and the second sound receiver 25 with regard to the first sound (S) output from the sound output section 28 and the second sound (V) of a user 2. The respective receiving ratios of the first sound receiver 24 and the second sound receiver 25 refers to what ratio of the first sound (S) and the second sound (V) are respectively received in the first sound receiver 24 and the second sound receiver 25. Specifically, referring to FIG. 3, with respect to the sound output section 28, the second sound receiver 25 is closer to the sound output section 28 than the first sound receiver 24. Thus, in the case of the first sound (S) of the sound output section 28, the sound component (S2) received in the second sound receiver 25 is more than the sound component (S1) received in the first sound receiver 24. Likewise, in the case of the second sound (V) of a user 2, the sound component (V1) received in the first sound receiver 24 is more than the sound component (V2) received in the second sound receiver 25. Such a receiving ratio of the first sound receiver 24 and the second sound receiver 25 is basically varied depending on arrangement of the first sound receiver 24 and the second sound receiver 25. Also, the respective receiving ratios of the first sound receiver 24 and the second sound receiver 25 may be subordinately determined in accordance with installation environments of the display apparatus 1. The respective receiving ratios of the first sound receiver 24 and the second sound receiver 25 may be represented in the form of a coefficient as shown in the following [Equation 1] and [Equation 2].

$$\text{First mixed sound}(S1+V1) = c11*S + c12*V \qquad \text{[Equation 1]}$$

$$\text{Second mixed sound}(S2+V2) = c21*S + c22*V \qquad \text{[Equation 2]}$$

Here, the coefficients c11 and c21 represent the respective receiving ratios of the first sound receiver 24 and the second sound receiver 25 with regard to the first sound (S) of the sound output section 28, and the coefficient c12 and c22 represent the respective receiving ratios of the first sound receiver 24 and the second sound receiver 25 with regard to the second sound (V) of a user 2. [Equation 1] and [Equation 2] brings the following [Equation 3].

$$\text{Second sound}(V)\text{ of a user} = (c22*(S1+V1) - c12*(S2+V2))/(c11*c22 - c12*c21) \qquad \text{[Equation 3]}$$

Thus, if the respective receiving ratios (c11 and c22) between the first sound receiver 24 and the second sound receiver 25 are determined, [Equation 3] may be used to obtain the second sound (V) of a user from the first mixed sound (S1+V1) and the second mixed sound (S2+V2).

The respective receiving ratios (c11 and c22) of the first sound receiver 24 and the second sound receiver 25 may be determined by actual measurement through a test. For example, the controller 26 can obtain the receiving ratios (c11 and c22) of the first sound receiver 24 and the second sound receiver 25, based on the test sound. The test sound may have a predetermined pattern. The test is carried out with regard to each of the first sound (S) of the sound output section 28 and the second sound (V) of a user 2, and the test sound may be provided with respect to each of them. The test sound corresponding to the second sound (V) of a user 2 may, for example, output from the remote controller to which a control command of a user is input. In this case, the remote controller stores the test sound corresponding to the second sound (V) of a user 2, and the test sound is output in accordance with the control command of a user or a request of the controller 26. Alternatively, the test corresponding to the second sound (V) of a user 2 may be carried out as a user 2 directly utters the test sound. In this case, the controller 26 may control the display 23 to show a user 2 a message for making him/her utter the test sound. The message may include information for guiding a user to utter a predetermined sound command, word, sentence, etc. needed for the test. The test may be performed with regard to the first sound (S) of the sound output section 28 and the second sound (V) of a user 2, in sequence or simultaneously. The test may be performed in accordance with a plurality of frequency domains, and the test sound may be provided corresponding to the plurality of frequency domains.

Referring to FIG. 2, the display apparatus 1 may further include a storage section 291 that stores information about the test sound. The test may be performed when the display apparatus 1 is installed. Also, the test may be performed again if the environment is changed after the installation of the display apparatus 1. The controller 26 may carry out the test if a user's control command is input through the command receiver 292. The controller 26 may provide a graphic user interface (GUI) menu to receive a user's control command for carrying out the test.

If the test is completed, the controller 26 may control the storage section 291 to store the receiving ratios (c11 and c22) of the first sound receiver 24 and the second sound receiver 25 determined by the test. As a result of the test, for example, the receiving ratios (c11 and c12) of the first sound receiver 24 and the second sound receiver 25 may be determined as 0.3 and 0.7 with regard to the first sound (S) of the sound output section 28, and the receiving ratios (c21 and c22) of the first sound receiver 24 and the second sound receiver 25 may be determined as 0.6 and 0.4 with regard to the second sound (V) of a user 2. The sound processor 27 refers to the receiving ratios (c11 and c22) of the first sound receiver 24 and the second sound receiver 25 stored in the storage section 291, and uses [Equation 3], thereby obtaining the second sound (V) of a user 2 from the first mixed sound (S1+V1) and the second mixed sound (S2+V2).

Thus, according to an exemplary embodiment, the sound is canceled based on the receiving ratio of the first sound receiver 24 and the second sound receiver 25 obtained by actual measurement through the test, so that the voice recognition for a user can be performed with higher reliability in accordance with installation environments of the display apparatus 1. Also, although the installation environments of the display apparatus 1 are changed, the test can be carried out again anytime in order to adjust the receiving ratio of the first sound receiver 24 and the second sound receiver 25, thereby improving the reliability.

Figure 5:
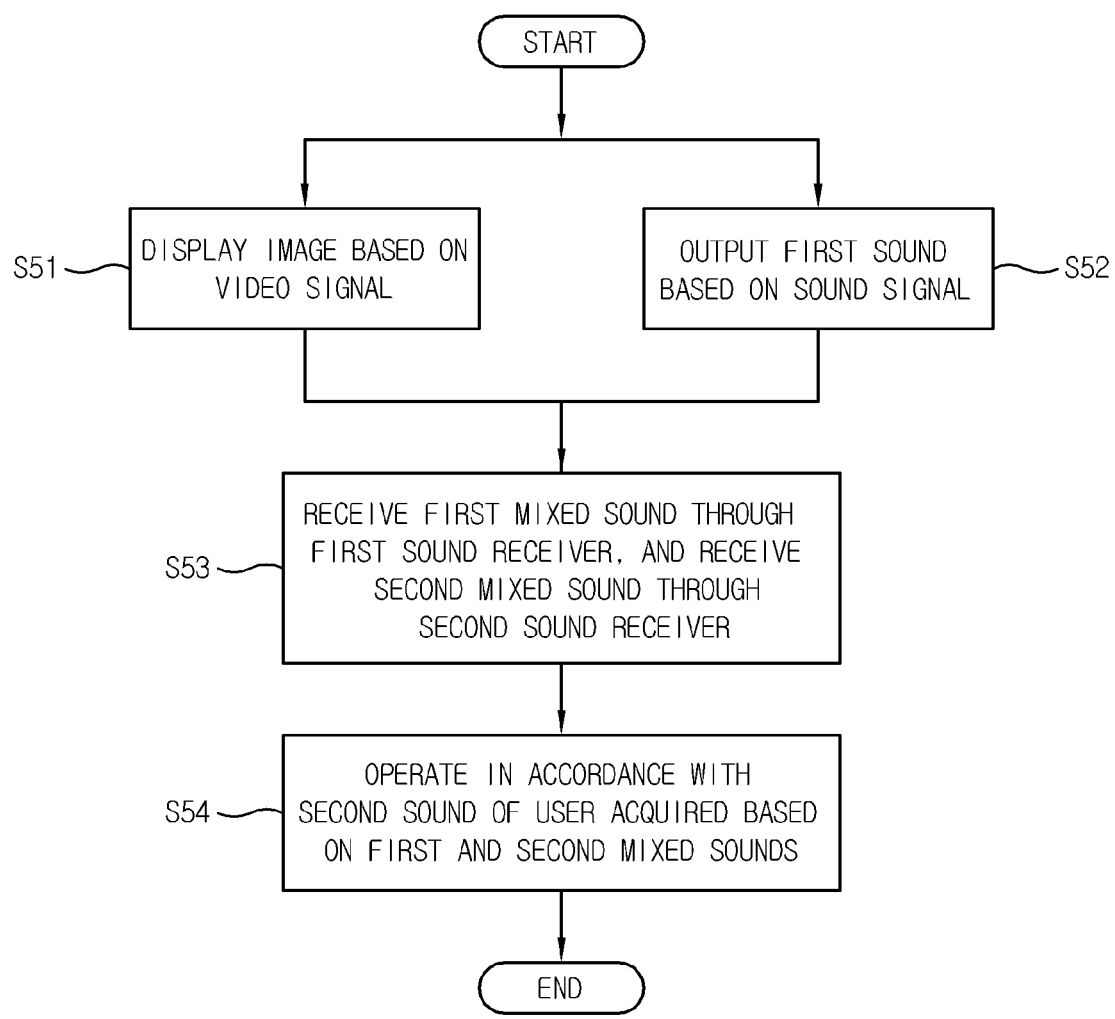
FIG. 5 is a flowchart showing operations of the display apparatus according to an exemplary embodiment.

FIG. 5 is a flowchart showing operations of the display apparatus 1 according to an exemplary embodiment. First, at operation S51, the display apparatus 1 displays an image based on a video signal. Meanwhile, at operation S52, the display apparatus 1 outputs a first sound based on a sound signal. Next, at operation S53, the display apparatus 1 uses the first sound receiver 24 to receive the first mixed sound of the first sound output from the display apparatus 1 and the second sound uttered by a user, and uses the second sound receiver 25 to receive the second mixed sound of the first sound and the second sound. Next, at operation S54, the display apparatus 1 operates in accordance with the second sound of a user obtained based on the received first and second mixed sounds.

Figure 6:
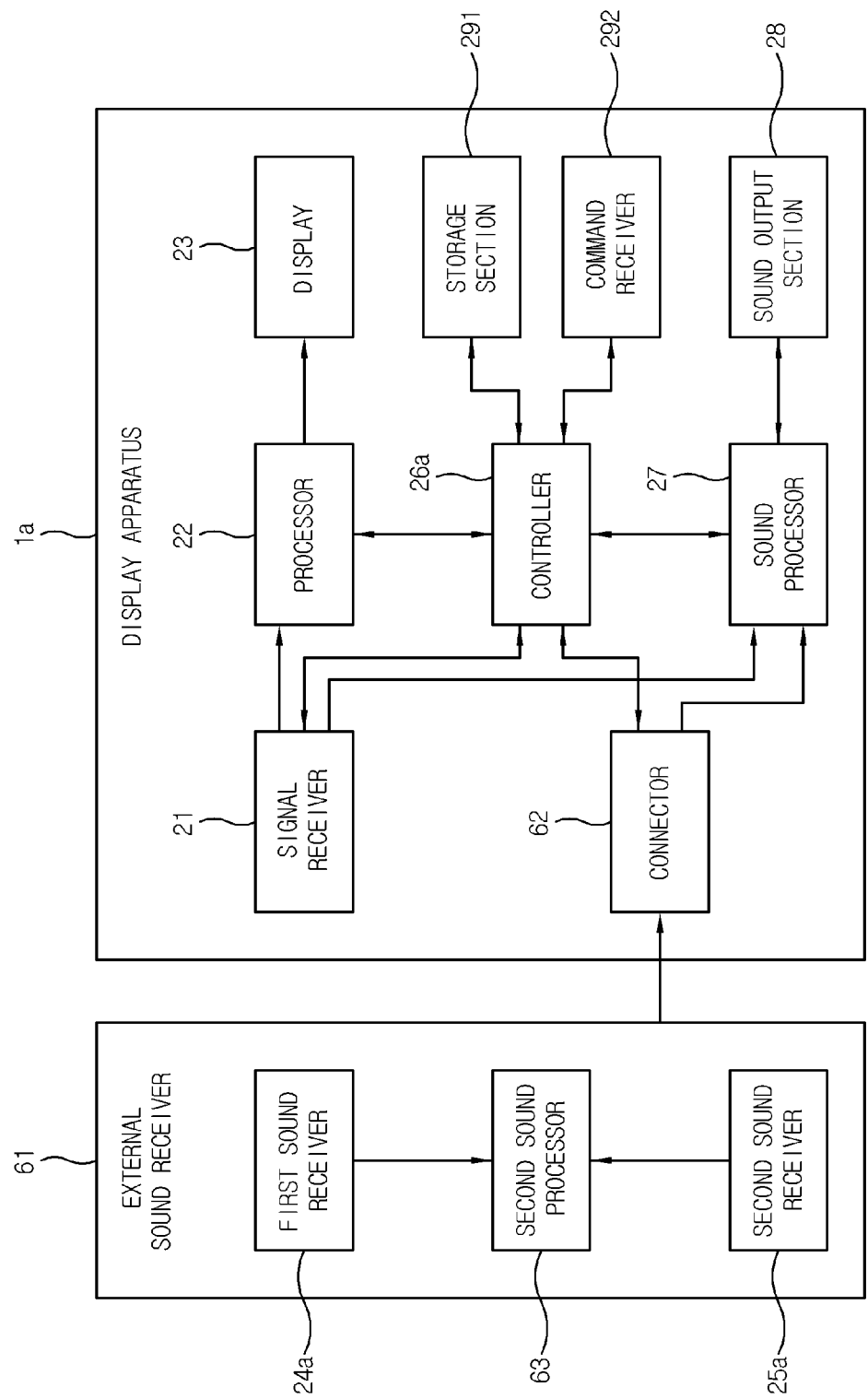
FIG. 6 is a block diagram showing elements of a display apparatus according to another exemplary embodiment.

FIG. 6 is a block diagram showing elements of a display apparatus 1a according to another exemplary embodiment. In the display apparatus 1a of FIG. 6, repetitive descriptions about the same or similar elements as those of the display apparatus 1 described with reference to FIGS. 1 to 5 will be avoided, as necessary. The display apparatus 1a may include the signal receiver 21, the image processor 22, the display 23, a first sound receiver 24a, a second sound receiver 25a, a controller 26a, a sound processor 27 and the sound output section 28. In this exemplary embodiment, the first sound receiver 24a and the second sound receiver 25a may be provided in an external sound receiver 61 provided as a separate element. The display apparatus 1a may further include a connector 62 to which the external sound receiver 61 provided with the first sound receiver 24a and the second sound receiver 25a is connected. The connector 62 may be for example provided as a universal serial bus (USB) port.

Figure 7:
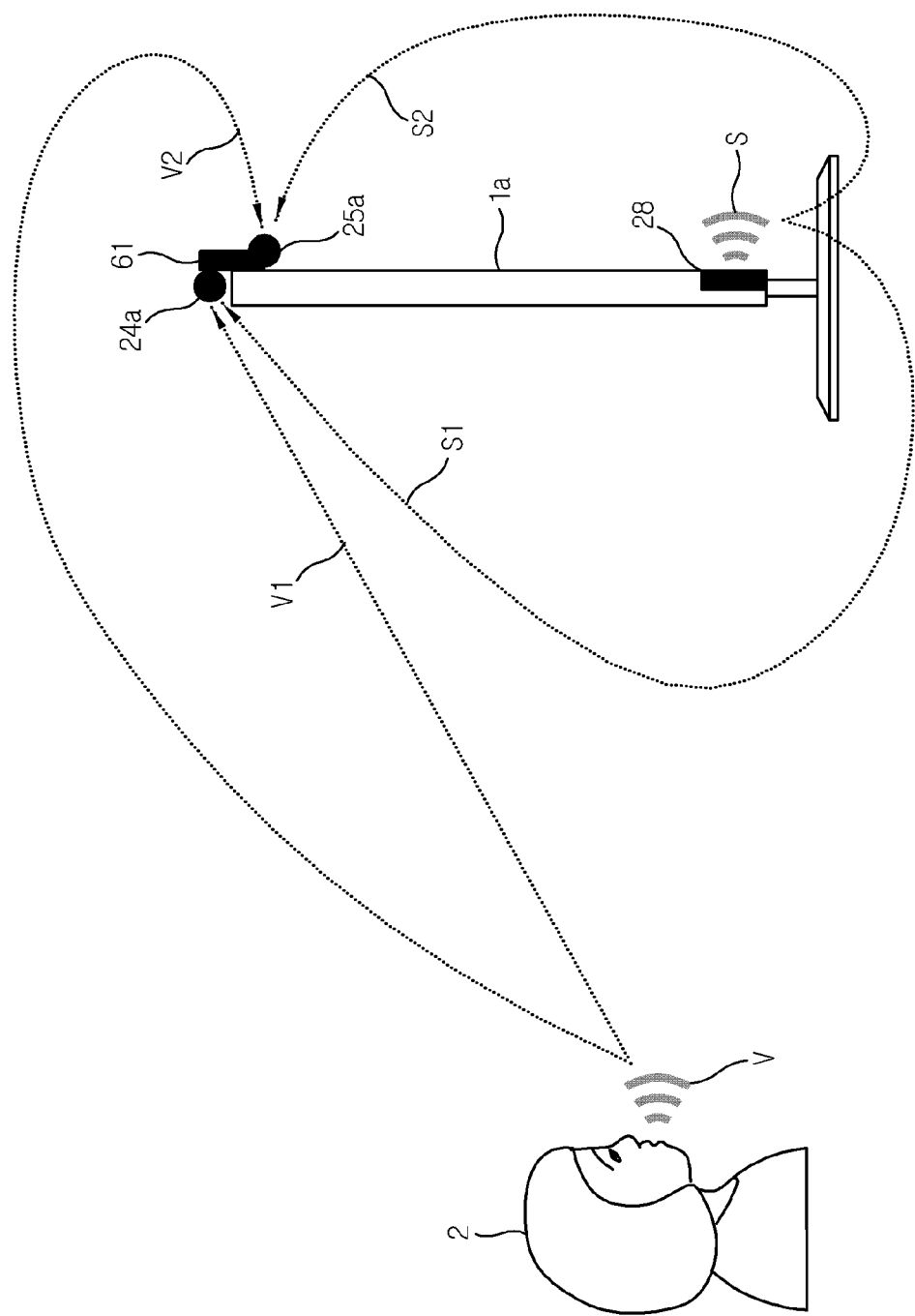
FIG. 7 shows a first sound receiver and a second sound receiver according to another exemplary embodiment.

FIG. 7 shows the external sound receiver 61 according to another exemplary embodiment. The first sound receiver 24a and the second sound receiver 25a are provided in the external sound receiver 61 and spaced apart from each other at a predetermined distance. As an exemplary embodiment, the first sound receiver 24a may be closer to a user 2, and the second sound receiver 25a may be closer to the sound output section 28 of the display apparatus 1a. As shown in FIG. 3, the first sound receiver 24a receives the first mixed sound (S1+V1) where the sound component (S1) based on the first sound (S) output from the sound output section 28 and the sound component (V1) based on the second sound (V) uttered by a user 2, are combined. Meanwhile, the second sound receiver 25a receives the second mixed sound (S2+V2) where the sound component (S2) based on the first sound (S) output from the sound output section 28 and the sound component (V2) based on the second sound (V) uttered by a user 2, are combined.

In this exemplary embodiment, the external sound receiver 61 obtains the second sound (V) of a user 2 from the first mixed sound (S1+V1) and the second mixed sound (S2+V2). The external sound receiver 61 may further include a second sound processor 63. The second sound processor 63 receives the first mixed sound (S1+V1) and the second mixed sound (S2+V2) from the first sound receiver 24a and the second sound receiver 25a. The second sound processor 63 obtains the second sound (V) of a user 2 from the first mixed sound (S1+V1) and the second mixed sound (S2+V2), based on the receiving ratio of the first sound receiver 24 and the second sound receiver 25 with regard to the first sound (S) output from the sound output section 28 and the second sound (V) of a user 2. The external sound receiver 61 may further include a storage section to store information about the receiving ratio of the first sound receiver 24a and the second sound receiver 25a. Alternatively, information about the receiving ratio of the first sound receiver 24a and the second sound receiver 25a may be received from the display apparatus 1a through the connector 62. The external sound receiver 61 transmits the obtained second sound (V) of a user 2 to the display apparatus 1a through the connector 62. The controller 26a applies the recognition to the second sound (V) of a user transmitted from the external sound receiver 61, and controls operations in accordance with the recognized command. Thus, according to an exemplary embodiment, an additional signal line and the like are not needed even though an external microphone is employed to receive the sound of a user, thereby preventing production costs from increasing or design space from being restricted.

As described above, according to an exemplary embodiment, a sound output from the display apparatus is canceled with high reliability without increasing costs or restricting a space in terms of voice recognition for a user.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A display apparatus comprising:
a display configured to display an image based on a video signal;
a sound output section output a first sound based on a sound signal;
a first sound receiver configured to receive a first mixed sound including the first sound and a second sound of a user;
a second sound receiver which is spaced apart from the first sound receiver and is configured to receive a second mixed sound including the first sound and the second sound; and
a controller configured to perform control in accordance with the second sound of a user acquired based on the first mixed sound and the second mixed sound,
wherein, the controller determines ratios of the first sound and the second sound in the first mixed sound and the second mixed sound, respectively received by the first sound receiver and the second receiver, based on a first test sound output from the sound output section and a second test sound output from the user when the user inputs test command, and
wherein, a mixed sound of the first test sound and the second test sound is received by the first sound receiver and the second sound receiver.

2. The display apparatus according to claim 1, wherein the first sound receiver is configured to be closer in distance than the second sound receiver, to the sound output section.

3. The display apparatus according to claim 1, wherein the second sound of a user is acquired based on respective receiving ratios of the first sound receiver and the second sound receiver with regard to the first sound and the second sound.

4. The display apparatus according to claim 3, wherein the controller determines the respective receiving ratios of the first sound receiver and the second sound receiver based on a test sound.

5. The display apparatus according to claim 4, wherein the test sound comprises a plurality of test sounds corresponding to a plurality of frequency domains, respectively.

6. The display apparatus according to claim 4, further comprising a storage section configured to store information about the respective receiving ratios determined based on the test sound.

7. The display apparatus according to claim 6, further comprising a control command receiver configured to receive a control command of the user,
wherein the controller performs a test based on the test sound in accordance with the control command of the user, and stores information about the determined respective receiving ratios in the storage section.

8. The display apparatus according to claim 1, wherein the first sound receiver and the second sound receiver are comprised in an external sound receiver, and the display apparatus further comprises a connector which is connected to the external sound receiver, and the display apparatus receives the acquired second sound from the external sound receiver.

9. A method of controlling a display apparatus, the method comprising:
displaying an image based on a video signal;
outputting a first sound based on a sound signal;
receiving a first mixed sound including the first sound and a second sound of a user through a first sound receiver, and receiving a second mixed sound including the first sound and the second sound through a second sound receiver, which is spaced apart from the first sound receiver;
determining ratios of the first sound and the second sound in the first mixed sound and the second mixed sound, respectively received by the first sound receiver and the second sound receiver, based on a first test sound output from a sound output section of the display apparatus and a second test sound output from the user when the user inputs test commands;
operating in accordance with the second sound of the user, the second sound being acquired based on the first mixed sound and the second mixed sound
wherein, a mixed sound of the first test sound and the second test sound is received by the first sound receiver and the second sound receiver.

10. The method according to claim 9, wherein the first sound receiver is configured to be closer than the second sound receiver in distance, to a sound output section.

11. The method according to claim 9, wherein the second sound of the user is acquired based on respective receiving ratios of the first sound receiver and the second sound receiver with regard to the first sound and the second sound.

12. The method according to claim 11, further comprising determining the respective receiving ratios of the first sound receiver and the second sound receiver based on a test sound.

13. The method according to claim 12, wherein the test sound comprises a plurality of test sounds corresponding to a plurality of frequency domains, respectively.

14. The method according to claim 13, further comprising storing information about the respective receiving ratio determined based on the test sound, in a storage section.

15. The method according to claim 14, further comprising receiving a control command of the user,
wherein the storing comprises performing a test based on the test sound in accordance with the control command of the user, and storing information about the determined respective receiving ratios in the storage section.

16. The method according to claim 9, further comprising receiving the acquired second sound from an external sound receiver comprising the first sound receiver and the second sound receiver.

17. The display apparatus according to claim 1, wherein the second sound receiver is spaced apart at a predetermined distance from the first sound receiver.

18. The method according to claim 9, wherein the second sound receiver is spaced apart at a predetermined distance from the first sound receiver.

19. The display apparatus according to claim 3, wherein the respective ratios relate to a ratio of the first sound to the second sound respectively received in the first sound receiver and the second sound receiver.

20. The method according to claim 11, wherein the respective ratios relate to a ratio of the first sound to the second sound respectively received in the first sound receiver and the second sound receiver.

* * * * *